United States Patent [19]

Murata

[11] Patent Number: 5,175,869
[45] Date of Patent: Dec. 29, 1992

[54] AUTOMATIC DATA TRANSMISSION SYSTEM

[75] Inventor: Akio Murata, Atsugi, Japan

[73] Assignee: Fujitsu Limited, Kawasaki, Japan

[21] Appl. No.: 743,136

[22] Filed: Aug. 9, 1991

[30] Foreign Application Priority Data

Aug. 10, 1990 [JP] Japan .................................. 2-212144

[51] Int. Cl.⁵ .............................................. H04B 7/00
[52] U.S. Cl. ...................................... 455/66; 455/89;
455/90; 455/348; 375/36
[58] Field of Search ...................... 455/41, 66, 89, 90,
455/127, 348; 375/36

[56] References Cited

U.S. PATENT DOCUMENTS

| | | | |
|---|---|---|---|
| 4,214,197 | 7/1980 | Mann et al. | 455/89 |
| 4,941,201 | 7/1990 | Davis | 455/41 |
| 4,984,295 | 1/1991 | Engstrom et al. | 455/89 |
| 5,054,112 | 10/1991 | Ike | 455/41 |
| 5,063,610 | 11/1991 | Alwadish | 455/66 |

FOREIGN PATENT DOCUMENTS

169237 9/1984 Japan.
248235 10/1988 Japan.

Primary Examiner—Reinhard J. Eisenzopf
Assistant Examiner—Timothy H. Keough
Attorney, Agent, or Firm—Staas & Halsey

[57] ABSTRACT

In a data transmission system, portable terminal equipment is detachably received and mounted in an adapter. The portable terminal equipment includes an input part for inputting input data, a data storage for storing the input data and destination information related to at least one destination, a first interface, a controller for storing the input data in the data storage in response to a first signal and for reading the input data and the destination information from the data storage and supplying the same to the first interface in response to a second signal, and a detection mechanism for generating the first and second signals. The adapter includes a receiving and mounting therein part for receiving the portable terminal equipment, a second interface which couples to the first interface when the portable terminal equipment is set within the receiving part of the adapter, and a communication part for automatically transmitting the input data, received via the second interface, to a destination via a communication line based on the destination information.

13 Claims, 4 Drawing Sheets

AUTOMATIC DATA TRANSMISSION SYSTEM

BACKGROUND OF THE INVENTION

The present invention generally relates to data transmission systems, and more particularly to a data transmission system which automatically transmits data to a host via a communication line. For example, the data is input from a bar code reader, a keyboard and the like and is stored in a portable terminal equipment which makes the automatic transmission.

Conventionally, there is a known portable terminal equipment which has a memory for storing data input from a bar code reader, a keyboard and the like, so that the stored data can be transmitted to a host via a communication line such as a public telephone line. When transmitting the data from such a portable terminal equipment, the portable terminal equipment is coupled to the communication line before displaying an operation menu on a display screen so as to select the "transmission" menu to start the data transmission. Alternatively, a "transmission key" of the keyboard is pushed to start the data transmission.

However, the conventional portable terminal equipment suffers from the following problems.

First, the operation of the portable terminal equipment is troublesome when transmitting the stored data to the host, because it requires the selection of the menu or the manipulation of a key to start the data transmission.

Second, the operator may forget to transmit the stored data to the host because the stored data will not be transmitted unless the operator specifically instructs the data transmission by selecting the menu or manipulating the key.

Third, the portable terminal equipment is not user-friendly because the data transmission will not be started unless the user performs an operation.

Therefore, there is a demand to realize a portable terminal equipment in which the above described problems are eliminated.

SUMMARY OF THE INVENTION

Accordingly, it is a general object of the present invention to provide a novel and useful data transmission system in which the problems described above are eliminated and the above described demand is satisfied.

Another and more specific object of the present invention is to provide a data transmission system comprising a portable terminal equipment and an adapter, where the portable terminal equipment is detachably provided with respect to the adapter. The portable terminal equipment includes input means for inputting input data, storage means for storing the input data and destination information related to at least one destination, a first interface, control means, coupled to the input means, the storage means and the first interface, for storing the input data into the storage means in response to a first signal, and for reading the input data and the destination information from the storage means and supplying the same to the first interface in response to a second signal, and first detection means for generating the first and second signals. The adapter includes a receiving part for receiving the portable terminal equipment, a second interface which couples to the first interface when the portable terminal equipment is set within the receiving part of the adapter, and communication means, coupled to the second interface, for automatically transmitting the input data received via the second interface to a destination via a communication line based on the destination information. The first detection means generates the first signal when the portable terminal equipment is removed from the receiving part of the adapter and generates the second signal when the portable terminal equipment is set in the receiving part of the adapter. In accordance with the data transmission system of the present invention, it is possible to automatically transmit the stored input data to the destination by simply setting the portable terminal equipment on the adapter. Hence, the operator need not initiate the data transmission by making a special operation such as manipulating a key, and it is therefore possible to prevent the operator from transmitting the input data to the destination.

Other objects and further features of the present invention will be apparent from the following detailed description when read in conjunction with the accompanying drawings.

DESCRIPTION OF THE PREFERRED EMBODIMENTS

Figure 1:
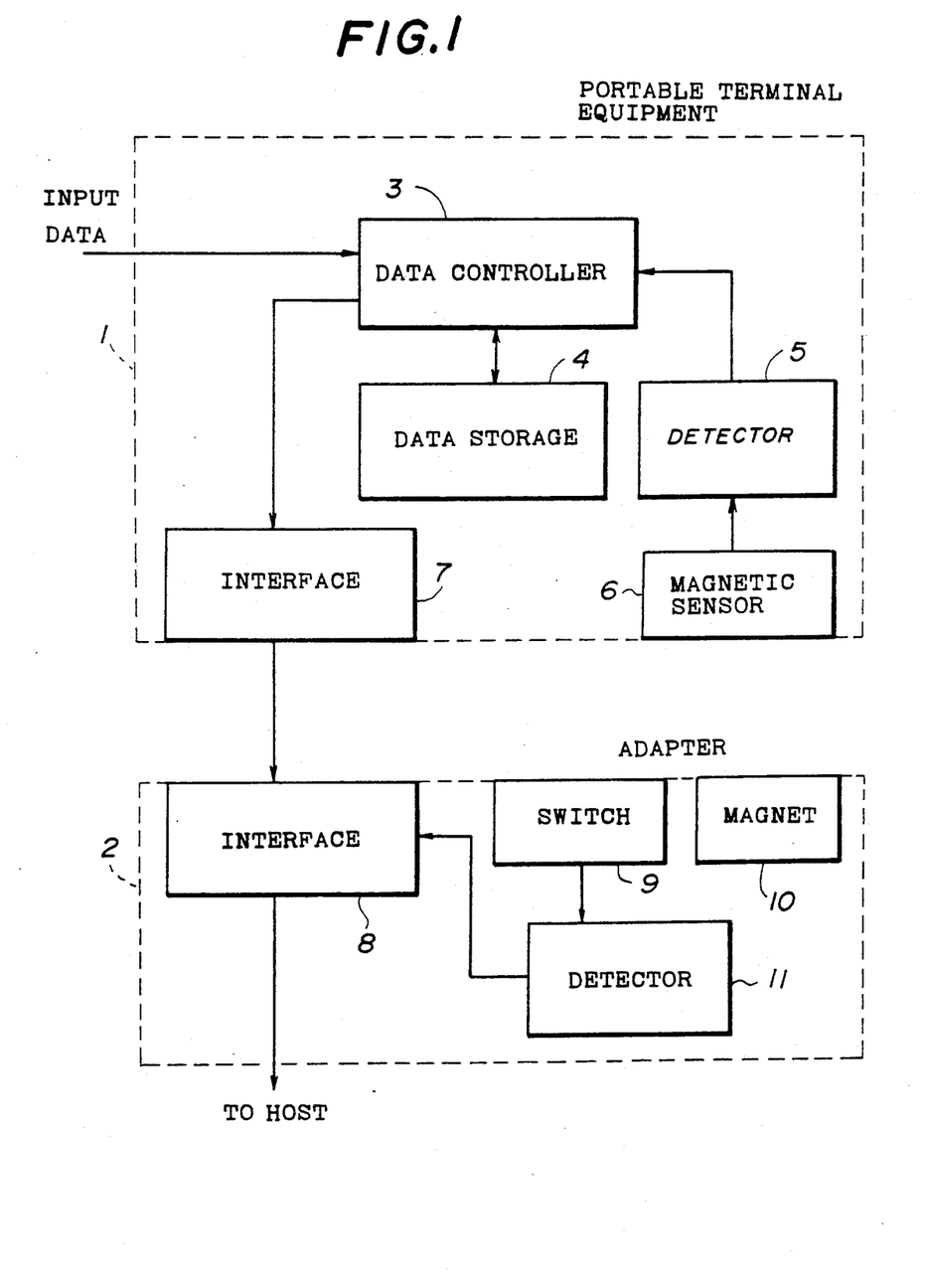
FIG. 1 is a system block diagram for explaining an operating principle of a data transmission system according to the present invention.

First, a description will be given of an operating principle of a data transmission system according to the present invention, by referring to FIG. 1. In FIG. 1, a portable terminal equipment 1 includes a data controller 3, a data storage 4, a detector 5, a magnetic sensor 6 and an interface 7 which are coupled as shown. On the other hand, an adapter 2 includes an interface 8, a switch 9, a magnet 10 and a detector 11 which are coupled as shown. The portable terminal equipment 1 is set on the adapter 2 when making a data transmission. For the sake of convenience, it is assumed that the interface 7 includes an electro-optic converter for converting an electric signal into an optical signal, and that the interface 8 includes an opto-electric converter for converting an optical signal into an electric signal.

The detector 5 of the portable terminal equipment 1 detects whether or not the portable terminal equipment 1 is set on the adapter 2 by detecting the magnetic field of the magnet 10, which is provided in the adapter 2, by the magnetic sensor 6, using the fact that the magnetic field sensed by the magnetic sensor 6 becomes less than a predetermined value when the portable terminal equipment 1 is removed from the adapter 2. The data controller 3 controls input and output of data to and from the portable terminal equipment 1, and the data storage 4 stores the input data under the control of the data controller 3. The data storage 4 also stores destination information related to the host to which the stored input data is to be transmitted.

In a state or condition, in which the portable terminal equipment 1 is removed from the adapter 2, the magnetic sensor 6 does not sense the magnetic field of the magnet 10. Hence, the input data is stored in the data storage 4 via the data controller 3. The input data may be input from a bar code reader, a keyboard and the like. On the other hand, the switch 9 also detects that the portable terminal equipment 1 is not set on the adapter 2. Hence, in this case, the detector 11 disables the interface 8 in response to an output signal of the switch 9 so that no erroneous data transmission will be made from the adapter 2 to a host (not shown).

In a state or condition, in which the portable terminal equipment 1 is set on the adapter 2, the magnetic sensor 6 senses the magnetic field of the magnet 10. The detector 5 detects the change in the magnetic field sensed by the magnetic sensor 6, and sends to the data controller 3 a detection signal which indicates that the portable terminal equipment 1 is set on the adapter 2. Hence, the data controller 3 reads the stored data from the data storage 4 and sends the read data to the interface 7. The interface 7 converts the data into an optical signal and transmits the optical signal to the interface 8 of the adapter 2. On the other hand, the switch 9 of the adapter 2 also detects that the portable terminal equipment 1 is set on the adapter 2. Hence, the detector 11 enables the interface 8 in response to the output detection signal of the switch 9. The enabled interface 8 converts the optical signal from the interface 7 into an electric signal and transmits this electric signal to the host.

Therefore, after the input data is stored in the data storage 4 of the portable terminal equipment 1, the operator does not need to operate the portable terminal equipment 1 in order to transmit the data to the host. Instead, the operator simply needs to set the portable terminal equipment 1 on the adapter 2. When the portable terminal equipment 1 is set on the adapter 2, the data stored in the data storage 4 of the portable terminal equipment 1 is automatically transmitted to the host via the interfaces 7 and 8 based on the destination information.

Figure 2A:
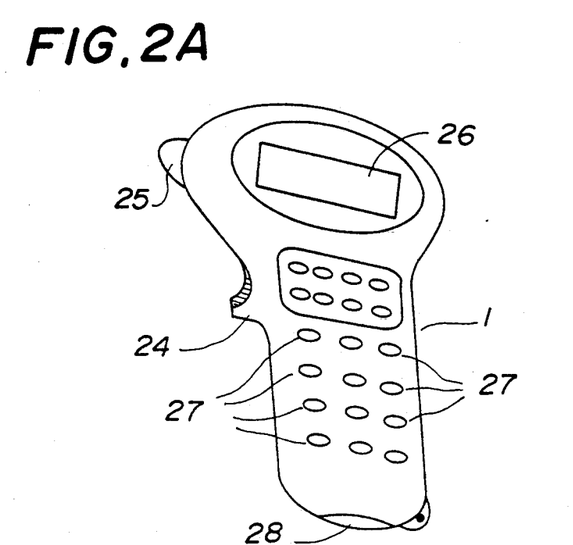
FIG. 2A is a perspective view showing a portable terminal equipment of an embodiment of the data transmission system according to the present invention.
Figure 2B:
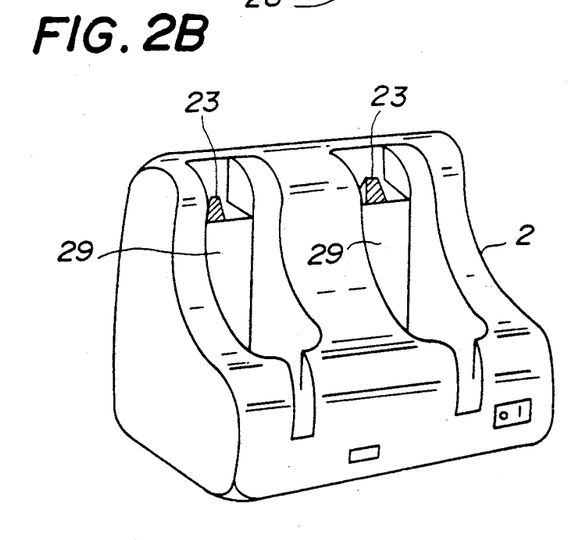
FIG. 2B is a perspective view showing an adapter of the embodiment of the data transmission system.
Figure 3:
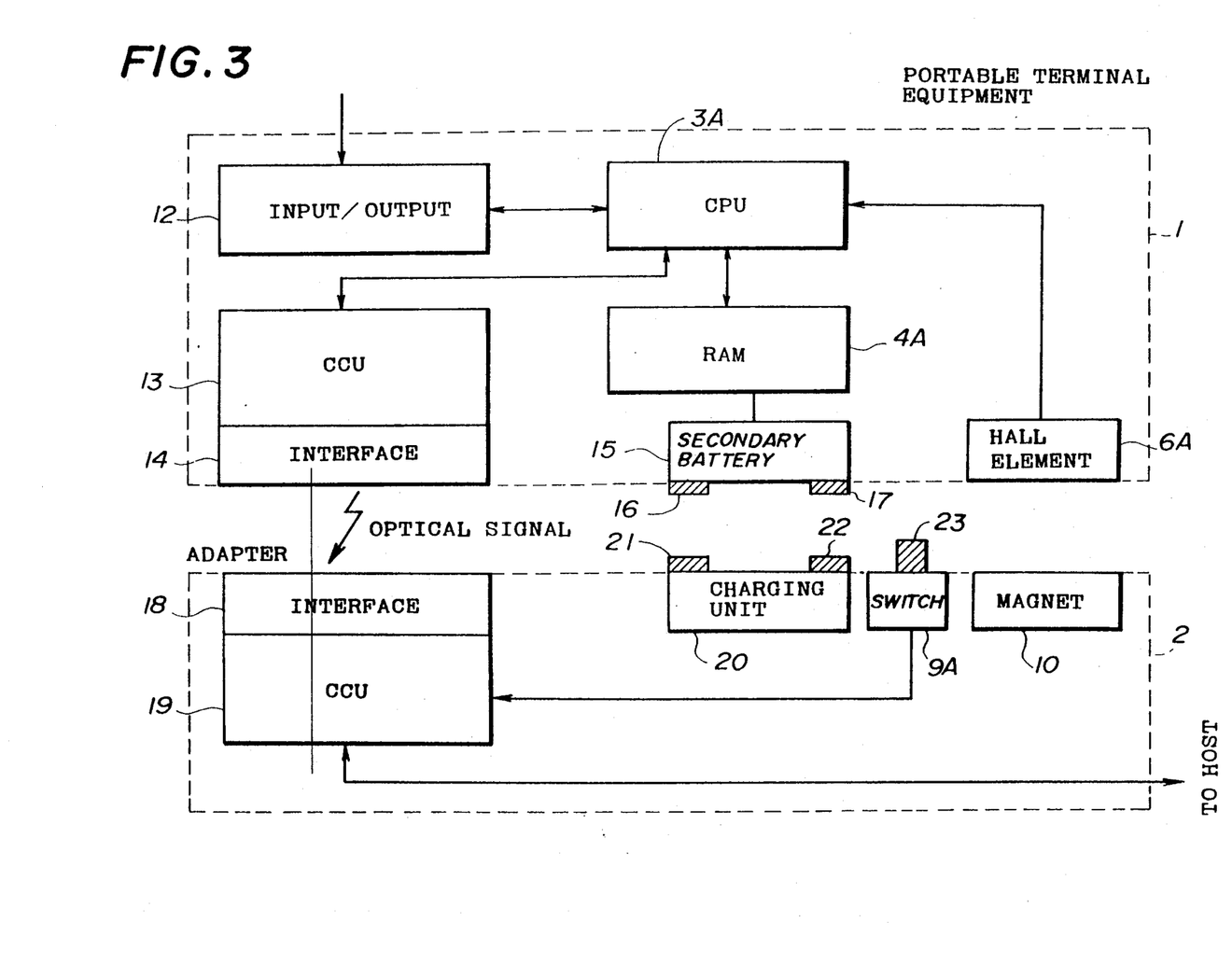
FIG. 3 is a system block diagram showing the embodiment of the data transmission system.

Next, a description will be given of an embodiment of the data transmission system according to the present invention, by referring to FIGS. 2A, 2B and 3. FIG. 2A shows a perspective view of the portable terminal equipment of this embodiment, and FIG. 2B shows a perspective view of the adapter 2 of this embodiment. FIG. 3 is a system block diagram showing this embodiment. In FIG. 3, those parts which are basically the same as those corresponding parts in FIG. 1 are designated by the same reference numerals.

As shown in FIG. 2A, the portable terminal equipment 1 includes a projection 24, a bar code reader 25, a display device 26, a ten-key keypad 27 and an optical interface/charging connector part 28. The input data read by the bar code reader 25 and various instructions input from the ten-key keypad 27 are input to an input/output component 12 shown in FIG. 3. Data to be displayed on the display device 26 are supplied to the display device 26 via the input/output part 12 under the control of the CPU 3A. The optical interface/charging connector part 28 is coupled to an optical interface 14 and a secondary battery 15 shown in FIG. 3. The portable terminal equipment 1 is provided with a central processing unit (CPU) 3A, a random access memory (RAM) 4A, a Hall element 6A, the input/output component 12, a communication control unit (CCU) 13, the optical interface 14 and the secondary battery 15 which are coupled as shown in FIG. 3.

The CPU 3A carries out the functions of the data controller 3 and the detector 5 shown in FIG. 1. In addition, the CCU 13 carries out the functions of the electro-optic converter of the interface 7 shown in FIG. 1.

On the other hand, as shown in FIG. 2B, the adapter 2 includes a movable piece, or plunger, 23, and two receiving parts 29 for receiving the portable terminal equipment 1. In this embodiment, two portable terminal equipments 1 can be set on the adapter 2. The movable piece 23 is coupled to a mechanical switch 9A. The adapter 2 includes with respect to each receiving part 29 the mechanical switch 9A, the magnet 10, an optical interface 18, a CCU 19 and a charging unit 20 which are coupled as shown in FIG. 3. For example, the mechanical switch 9A is a microswitch.

The CCU 19 carries out the functions of the opto-electric converter of the interface 8 shown in FIG. 1. The adapter 2 is coupled to an A.C. power source (not shown) and is connectable to a host (not shown) via a communication line such as a public telephone line. Of course, the adapter 2 may be connected directly to the host, or may be connected indirectly to the host via a personal computer (not shown).

The optical interface/charging connector part 28 and a corresponding connector part of the adapter 2 are arranged at positions such that these optical interfaces 14 and 18 confront each other and become coupled and terminals 16 and 17 of the secondary battery 15 make contact with corresponding terminals 21 and 22 of the charging unit 20 when the portable terminal equipment 1 is set within the receiving part 29 of the adapter 2. In addition, the Hall element 6A of the portable terminal equipment 1 is arranged at a position such that the Hall element 6A confronts the magnet 10 of the adapter 2 when the portable terminal equipment 1 is set within the receiving part 29 of the adapter 2.

When the portable terminal equipment 1 is removed from the receiving part 29 of the adapter 2, this removed state is detected by the Hall element 6A of the portable terminal equipment 1 and by the mechanical switch 9A of the adapter 2. In this case, the Hall element 6A does not detect the magnetic field of the magnet 10, and no interrupt signal is sent to the CPU 3A from the Hall element 6A. Thus, the CPU 3A enters the input data which is read by the bar code reader 25 into the input/output part and stores the input data into the RAM 4A, and supplies a message to be displayed on the display device 26 via the input/output part 12. For example, the message corresponds to the input data which is stored in the RAM 4A so that the operator may check the input data which is actually stored. On the other hand, the mechanical switch 9A is OFF when the movable piece 23 is not pushed by the projection 24 of the portable terminal equipment 1. Hence, the CCU 19 of the adapter 2 immediately disables the optical interface 18 in response to an output signal of the mechanical switch 9A which is OFF and disables the opto-electric conversion function of the CCU 19, so as to prevent an erroneous data transmission which may be caused by external light which enters the connector part of the adapter 2 as noise.

When the portable terminal equipment 1 is set in the receiving part 29 of the adapter 2, the projection 24 pushes the movable piece 23 of the mechanical switch 9A and turns the mechanical switch 9A ON. In addition, the optical interface/charging connector part 28 connects to the corresponding connector part within the receiving part 29. As a result, the optical interfaces 14 and 18 are coupled, and the terminals 16 and 17 of the secondary battery 15 are coupled to the corresponding terminals 21 and 22 of the charging unit 20. Hence, the secondary battery 15 which supplies a power source voltage to various parts within the portable terminal equipment 1 including the RAM 4A, is charged by the charging unit 20 when the portable terminal equipment 1 is set within the receiving part 29 of the adapter 2.

The charging unit 20 detects a current flow when the terminals 16 and 17 of the secondary battery 15 make contact with the corresponding terminals 21 and 22, and starts controlling the charging process by monitoring the time, voltage or the like. The charging unit 20 stops the charging process when a fully charged state is detected.

The CCU 19 enables the optical interface 18 of the adapter 2 and enables the opto-electric conversion function of the CCU 19 in response to the output signal of the mechanical switch 9A which is ON. Hence, it becomes possible to transmit data received via the optical interface 18 from the CCU 19.

On the other hand, the Hall element 6A of the portable terminal equipment 1 detects the magnetic field of the magnet 10 when the portable terminal equipment 1 is set within the receiving part 23 of the adapter 2. As a result, the CPU 3A is notified of this removal of the portable terminal equipment 1 from the adapter 2 by an interrupt signal from the Hall element 6A. Hence, the CPU 3A detects that the portable terminal equipment 1 is set in the adapter 2, and reads the stored data from the RAM 4A. The CPU 3A supplies the read data to the CCU 13, and the CCU 1 converts the data into an optical signal before transmitting the same Via the optical interface 14.

Therefore, the optical signal from the interface 14 of the portable terminal equipment 1 is received by the optical interface 18 of the adapter 2, and the input data input to the portable terminal equipment 1 is automatically transmitted to the host via the CCU 19 of the adapter 2.

For example, the destination of the input data, that is, the telephone number of the host, is stored in the RAM 4A together with the input data as destination information. This destination information may be input from the ten-key keypad 27 every time the input data is input to the portable terminal equipment 1, but preferably, the destination information is prestored in the RAM 4A. In the latter case, the operator simply needs to input the input data into the portable terminal equipment 1 and set the portable terminal equipment 1 on the adapter 2 when the input data is to be transmitted to the host. The adapter 2 then automatically transmits the input data to the host, and there is no need for the operator to make an operation such as dialing the telephone number of the host and manipulating keys to start the data transmission.

Of course, when there are a plurality of destinations, the RAM 4A may store the telephone numbers of the destinations and the operator may select one of the stored destinations from the ten-key keypad 27 or a function key (not shown) when inputting the input data into the portable terminal equipment 1.

The interrupt signal which is generated from the Hall element 6A and supplied to the CPU 3A when the portable terminal equipment 1 is set on the adapter 2 may have a first logic value (for example, a high-level signal). Further, a signal which is supplied from the Hall element 6A to the CPU 3A when the portable terminal equipment 1 is removed from the adapter 2 may have a second logic value (for example, a low-level signal) different from the first logic value. Similarly, the detection signal which is output from the mechanical switch 9A to the CCU 19 when the portable terminal equipment 1 is set on the adapter 2 may have a first logic value (for example, a high-level signal). Further, a signal which is supplied from the mechanical switch 9A to the CCU 19 when the portable terminal equipment 1 is removed from the adapter 2 may have a second logic value (for example, a low-level signal) different from the first logic value.

Figure 4:
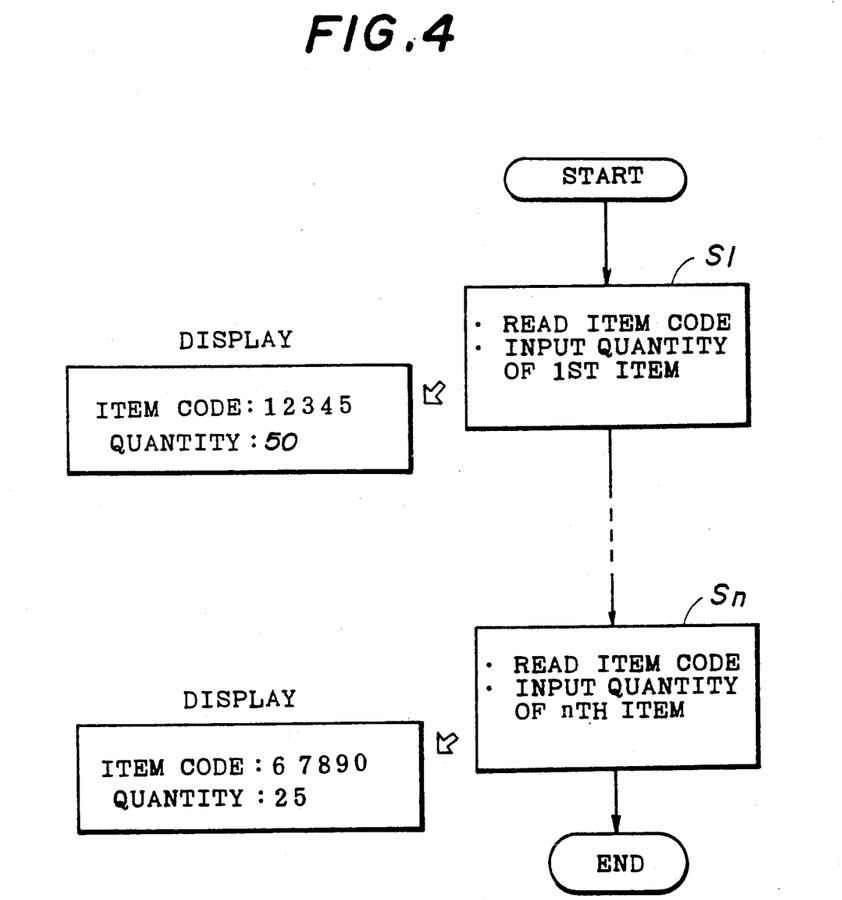
FIG. 4 is a flow chart for explaining an embodiment of a data input to the portable terminal equipment of the embodiment.

The input data may be input to the portable terminal equipment 1 in various manners. FIG. 4 shows a flow chart for explaining one embodiment of the data input to the portable terminal equipment 1. For the sake of convenience, it is assumed that the data transmission system is used to notify the stock of items (i.e., an inventory count) to the host. In a step S1, an item code is read by reading a bar code, which describes the first item by the bar code reader 25 of the portable terminal equipment 1, and the operator inputs a quantity of the first item which needs to be supplied from the ten-key 27. As a result, information shown within the step S1 is displayed on the display device 26 so that the operator may check the input data. An operation similar to the step S1 is carried out for second through (n−1)th items, and a step Sn carries out an operation for the nth item. Thus, information shown within the step Sn is displayed on the display device 26. Thereafter, the operator sets the portable terminal equipment 1 on the adapter 2, and no further operation needs to be made by the operator beyond this point. In other words, the adapter 2 automatically calls the telephone number of the host which is received from the portable terminal equipment 1 together with the input data, and transmits the input data related to the first through nth items to the host.

As a modification of the above described embodiment, a main battery may be used in place of the charging unit 20. In this case, a nickel cadmium (Ni-Cd) battery is used as the main battery, and a lithium (Li) battery is used as the secondary battery 15. In this case, the secondary battery is used as a back-up power supply for the RAM 4A.

As another modification of this embodiment, the optical interfaces 14 and 18 may be a serial interface such as RS232C.

In the described embodiment, the data transmission from the portable terminal equipment 1 to the adapter 2 is realized by optical data transmission. However, it is of course possible to make the data transmission by the conventional electrical data transmission. In this case, the noise entering the conventional interface of the adapter 2 is negligible and it is not essential to disable the CCU 19 when the portable terminal equipment 1 is not set on the adapter 2. Hence, the movable piece 23 and the mechanical switch 9A of the adapter 2 may be omitted in this case.

Moreover, the means for detecting the set and removed state of the portable terminal equipment 1 with respect to the adapter 2 is not limited to the magnetic means of the described embodiment, and any suitable means may be used instead.

Further, the present invention is not limited to these embodiments, but various variations and modifications may be made without departing from the scope of the present invention.

What is claimed is:

1. A data transmission system for transmitting data over a communication line to a destination identified by destination information, comprising:

a portable terminal and an adapter, the adapter having a receiving part for detachably receiving the portable terminal;

the portable terminal comprising:

input means for inputting input data, storage means for storing the input data and destination information related to at least one destination corresponding to the input data, first detection means for detecting that the portable terminal is not detachably received in the receiving part of the adapter and generating a first signal indicative thereof and for detecting when the portable terminal is detachably received in the receiving part of the adapter and generating a second signal indicative thereof, first interface means, coupled to the storage means, for receiving input data and destination information from the storage means and operative, when the portable terminal is received in the receiving part of the adapter, for supplying same to the adapter, and control means, coupled to the input means, the storage means, the first detection means and the first interface means, and responsive to the first signal for controlling the storing of the input data from the input means in the storage means and responsive to the second signal for reading the input data and the destination information from the storage means and supplying same to the first interface means; and the adapter further comprising:

second detection means for detecting the portable terminal, when detachably received in the receiving part of the adapter, and generating in response to such detection a corresponding, received terminal detection output, second interface means, disposed in signal-coupling relationship to the first interface of the portable terminal when the portable terminal is detachably received in the receiving part of the adapter, for receiving the input data and destination information supplied thereto by the first interface, and communication means, coupled to the second interface and to the second detection means and responsive to the received terminal detection output of the second detection means, for automatically transmitting the input data received by the second interface, and in accordance with the corresponding destination information likewise received by the second interface, to the thereby identified destination over a corresponding communication line.

2. The data transmission system as claimed in claim 1, wherein:

the adapter further comprises a magnet which produces a magnetic field; and the first detection means of said portable terminal comprises means for sensing the magnetic field produced by the magnet of the adapter and for generating the first signal when the sensed magnetic field is less than a predetermined value related to the portable terminal not being received in the receiving part of the adapter and generating the second signal when the sensed magnetic field is equal to or greater than the predetermined value.

3. The data transmission system as claimed in claim 1, wherein the first signal has a first logic value and the second signal has a second logic value different from the first logic value.

4. The data transmission system as claimed in claim 1, wherein the portable terminal further comprises power source voltage supplying means for supplying a power source voltage to the input means, the storage means, the first interface means and the control means of the portable terminal.

5. The data transmission system as claimed in claim 4, wherein:

the power source voltage supplying means comprises a rechargeable battery and external connection terminals, connected to the rechargeable battery; and the adapter further comprises a charging unit having external connection terminals disposed for contacting the external connection terminals of the portable terminal when the portable terminal is detachably received in the receiving part of the adapter, the charging unit automatically supplying charging power, when the portable terminal is detachably received in the receiving part of the adapter, through the respective external terminals of the adapter and the portable terminal and to the rechargeable battery.

6. The data transmission system as claimed in claim 1, wherein the input means of the portable terminal further comprises a bar code reader for reading bar codes and thereby inputting the bar code data, as read, as the input data.

7. The data transmission system as claimed in claim 1, wherein the input means of the portable terminal further comprises plural keys, selectively actuable for inputting information, including the input data and instructions.

8. The data transmission system as claimed in claim 7, wherein the instructions selectively input by the keys include selective, different destination information.

9. The data transmission system as claimed in claim 1, wherein:

the input means is operable for selectively inputting input data and other information; and the portable terminal equipment further comprises a display device for displaying the input data and other information as selectively input by the input means.

10. The data transmission system as claimed in claim 1, wherein:

the first interface means further comprises means for converting the input data and the destination information, read from the storage means, into an optical signal; and the second interface means further comprises means for converting at least the portion of the optical signal corresponding to the input data, as received from the first interface means, into an electrical signal for transmission by the communication means to the destination.

11. The data transmission system as claimed in claim 10, wherein the adapter further comprises:

third detection means for generating a third signal when the portable terminal is removed from the receiving part of the adapter and generating a fourth signal when the portable terminal is detachably received in the receiving part of the adapter; and disabling means for disabling the communication means in response to the third signal from the third detection means.

12. The data transmission system as claim in claim 11, wherein:

the portable terminal further comprises a projection; and the adapter further comprises a switch disposed to be actuated by the projection of the portable terminal when the portable terminal is detachably received in the receiving part of the adapter.

13. The data transmission system as claimed in claim 11, wherein the third signal has a first logic value and the fourth signal has a second logic value different from the first logic value.

* * * * *

UNITED STATES PATENT AND TRADEMARK OFFICE
CERTIFICATE OF CORRECTION

PATENT NO. : 5,175,869
DATED : December 29, 1992
INVENTOR(S) : Akio MURATA

It is certified that error appears in the above-indentified patent and that said Letters Patent is hereby corrected as shown below:

[57] ABSTRACT:
    line 12, after "includes a" insert --receiving part for--;
    line 13, delete "part for receiving".

Col. 3,   line 1, after "state" insert --,--;

line 13, after "state" insert --,--.

Col. 5,   line 7, after "battery 15" insert --,--.

Col. 6,   line 2, change "signal). Further," to --signal); further,--;
        line 10, change "signal). Further," to --signal); further,--;
        line 23, after "item" insert --,--.

Signed and Sealed this

Fourteenth Day of June, 1994

*Attest:*

BRUCE LEHMAN

*Attesting Officer*     Commissioner of Patents and Trademarks